United States Patent
Roach et al.

(10) Patent No.: US 10,024,333 B2
(45) Date of Patent: Jul. 17, 2018

(54) COMPOSITE AIRFOIL BONDED TO A METALLIC ROOT

(71) Applicant: UNITED TECHNOLOGIES CORPORATION, Hartford, CT (US)

(72) Inventors: James T. Roach, Vernon, CT (US); Grant O. Cook, III, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 257 days.

(21) Appl. No.: 14/866,194

(22) Filed: Sep. 25, 2015

(65) Prior Publication Data

US 2016/0010658 A1 Jan. 14, 2016

Related U.S. Application Data

(63) Continuation of application No. PCT/US2014/034698, filed on Apr. 18, 2014.

(60) Provisional application No. 61/836,003, filed on Jun. 17, 2013.

(51) Int. Cl.

| F01D 5/14 | (2006.01) |
|---|---|
| F04D 29/38 | (2006.01) |
| F01D 5/28 | (2006.01) |
| F01D 5/30 | (2006.01) |
| F04D 29/32 | (2006.01) |
| B23P 15/04 | (2006.01) |
| F04D 29/34 | (2006.01) |

(52) U.S. Cl.
CPC ............ *F04D 29/388* (2013.01); *B23P 15/04* (2013.01); *F01D 5/147* (2013.01); *F01D 5/282* (2013.01); *F01D 5/30* (2013.01); *F04D 29/322* (2013.01); *F04D 29/324* (2013.01); *F04D 29/34* (2013.01); *F05D 2220/36* (2013.01); *F05D 2230/232* (2013.01); *F05D 2240/303* (2013.01)

(58) Field of Classification Search
CPC . F01D 5/282; F01D 5/147; F01D 5/28; F01D 5/284
See application file for complete search history.

(56) References Cited

U.S. PATENT DOCUMENTS

| 3,883,267 A * | 5/1975 | Baudier .................. F01D 5/282 |
|---|---|---|
| | | 416/230 |
| 5,634,771 A | 6/1997 | Howard et al. |
| 5,785,498 A | 7/1998 | Quinn et al. |
| 6,431,837 B1 | 8/2002 | Velicki |

(Continued)

OTHER PUBLICATIONS

International Search Report and Written Opinion dated Aug. 28, 2014 in PCT Application No. PCT/US2014/034698.

(Continued)

*Primary Examiner* — Justin Seabe
*Assistant Examiner* — Behnoush Haghighian
(74) *Attorney, Agent, or Firm* — Snell & Wilmer, L.L.P.

(57) ABSTRACT

The present disclosure relates to composite airfoils bonded to a metallic root. A composite body (510) may be formed with a metallic co-molded detail (520). The co-molded detail (520) may be transient liquid phase (TLP) bonded to an attachment feature (530). The attachment feature (530) may allow the composite body (510) to be attached to a rotor (200). The airfoil (500) may also have a metallic edge (550) which is TLP bonded to the composite body (510) via a co-molded edge (540).

11 Claims, 6 Drawing Sheets

(56) References Cited

U.S. PATENT DOCUMENTS

| | | | |
|---|---|---|---|
| 6,607,358 B2 * | 8/2003 | Finn | B23P 15/04 |
| | | | 416/224 |
| 6,613,392 B2 | 9/2003 | Baldwin et al. | |
| 6,843,928 B2 * | 1/2005 | Cline | C23F 1/26 |
| | | | 216/100 |
| 8,366,392 B1 | 2/2013 | Liang | |
| 8,383,028 B2 | 2/2013 | Lyons | |
| 8,801,388 B2 | 8/2014 | Ortiz | |
| 2002/0112804 A1 * | 8/2002 | Woods | B29C 66/1122 |
| | | | 156/73.1 |
| 2005/0260078 A1 * | 11/2005 | Potter | F01D 5/282 |
| | | | 416/219 R |
| 2006/0071056 A1 * | 4/2006 | Das | B23K 20/02 |
| | | | 228/245 |
| 2009/0119919 A1 | 5/2009 | Kington et al. | |
| 2010/0296942 A1 * | 11/2010 | Jevons | F01D 5/282 |
| | | | 416/229 R |
| 2011/0052405 A1 * | 3/2011 | Parkin | F01D 5/147 |
| | | | 416/230 |
| 2011/0194941 A1 * | 8/2011 | Parkin | B29C 70/48 |
| | | | 416/224 |

OTHER PUBLICATIONS

International Preliminary Report on Patentability dated May 21, 2015 in PCT Application No. PCT/US2014/034698.

Macdonald, et al., "Transient Liquid Phase Bonding," Annual Review of Material Science, 1992, vol. 22, pp. 23-46.

Cook, III, et al., "Overview of Transient Liquid Phase and Partial Transient Liquid Phase Bonding," Journal of Materials Science vol. 46, 2011, pp. 5305-5323, Springer Science + Business Media, LLC.

* cited by examiner

COMPOSITE AIRFOIL BONDED TO A METALLIC ROOT

CROSS-REFERENCE TO RELATED APPLICATIONS

This application is a continuation of, claims priority to and the benefit of, PCT/US2014/034698 filed on Apr. 18, 2014 and entitled "COMPOSITE AIRFOIL BONDED TO A METALLIC ROOT," which claims priority from U.S. Provisional Application No. 61/836,003 filed on Jun. 17, 2013 and entitled "COMPOSITE AIRFOIL BONDED TO A METALLIC ROOT." Both of the aforementioned applications are incorporated herein by reference in their entirety.

FIELD OF INVENTION

The present disclosure relates generally to composite airfoils. More particularly, the present disclosure relates to bonding composite airfoils to metallic roots.

BACKGROUND OF THE INVENTION

Airfoils may be used in many applications, including as blades for fans, impellers, turbines, propellers, etc. Airfoils may be manufactured from many different materials. In some cases, airfoils may be manufactured from composite materials such as polymer matrix composites (PMCs), ceramic matrix composites (CMCs), or metal matrix composites (MMCs). The airfoils may be attached to a metallic rotor at a root of the airfoil. However, in certain designs the root may comprise features undesirable for attachment to composite materials.

SUMMARY OF THE INVENTION

According to various embodiments, a fan blade is disclosed. The fan blade may comprise a composite body and a metallic co-molded detail coupled to the composite body. The co-molded detail may be integrally formed with the composite body. The fan blade may further comprise a metallic attachment feature bonded to the co-molded detail. The attachment feature may be bonded to the co-molded detail via transient liquid phase (TLP) bonding. The fan blade may further comprise a transient liquid phase region between the co-molded detail and the attachment feature. The fan blade may further comprise a metallic edge coupled to the composite body via a co-molded edge.

According to various embodiments, a rotor is disclosed. The rotor may comprise a disk and an airfoil coupled to the disk. The airfoil may comprise a composite body, a metallic co-molded detail integrally formed within the composite body, and a metallic root TLP bonded to the co-molded detail. The metallic root may couple the airfoil to the disk. The airfoil may further comprise a TLP bonded region between the co-molded detail and the root. The co-molded detail may further be coupled to the composite body via at least one of interleaves, stitching, weaving, and interlock.

According to various embodiments, a method of manufacturing a fan blade is disclosed. The method may include co-molding a composite body and a co-molded detail. The method may further include providing at least one metallic interlayer between the co-molded detail and an attachment feature. A bonding region comprising the interlayer may be heated to a bonding temperature, and the interlayer may diffuse into at least one of the co-molded detail and the attachment feature. The heating may result in a bond between the co-molded detail and the attachment feature. The method may further include maintaining the bonding region at the bonding temperature until the interlayer has isothermally solidified.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
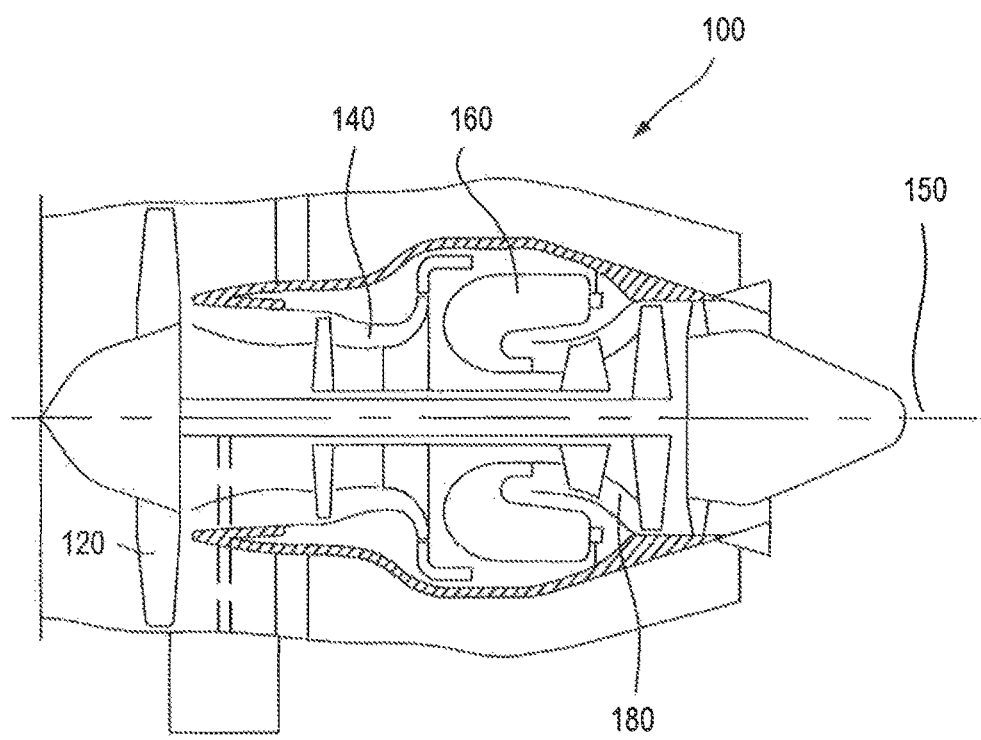
FIG. 1 illustrates a schematic axial cross-section view showing an example of a gas turbine engine according to various embodiments of the disclosure.

Referring to FIG. 1, a gas turbine engine 100 is illustrated according to various embodiments. The engine 100 may be of a type provided for use in subsonic flight, generally comprising in serial flow communication a fan 120 through which ambient air is propelled, a compressor section 140 for pressurizing the air, a combustor 160 in which the compressed air is mixed with fuel and ignited for generating an annular stream of hot combustion gases, and a turbine section 180 for extracting energy from the combustion gases. Axis of rotation 150 may define the forward-aft position of engine 100. For example, fan 120 may be referred to as forward of turbine section 180 and turbine section 180 may be referred to as aft of fan 120. As air flows from fan 120 to the more aft components of gas turbine engine 100, axis of rotation 150 may also generally define the direction of the air stream flow.

Figure 2:
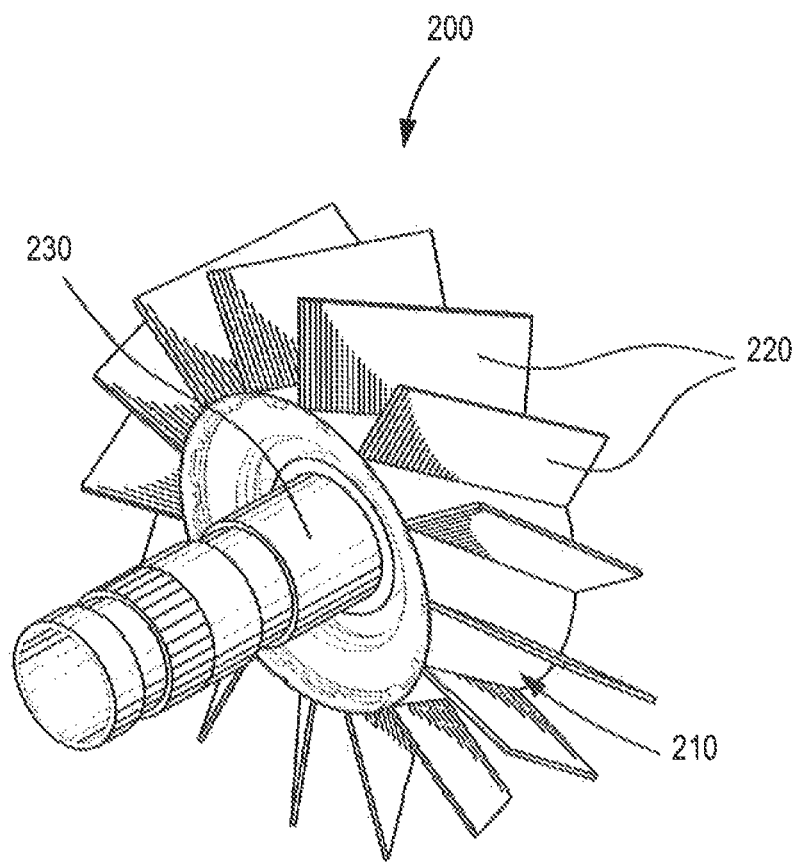
FIG. 2 illustrates a schematic perspective view of a rotor which can be used in a gas turbine engine according to various embodiments.

Referring to FIG. 2, a rotor 200 which may be used in the gas turbine engine 100 of FIG. 1 or in any other adequate type of gas turbine engine 100 is illustrated. In the illustrated embodiment, rotor 200 is a first stage of a high pressure compressor of the compressor section 140. However, it is understood that the rotor can be any other rotor of the gas turbine engine, including a turbine rotor.

Rotor 200 may comprise disk 210 which supports a circumferential array of regularly spaced fan blades 220. The rotor disk 210 and fan blades 220 may be, but are not necessarily integrally molded. The disk 210 may include a hub 230 for engaging a central shaft.

Fan blades 220 may comprise a variety of shapes. As illustrated in FIG. 2, fan blades 220 may be substantially flat. However, in various embodiments, fan blades 220 may be curved in 2 or 3 dimensions, and may comprise an airfoil structure as shown in FIG. 3.

Figure 3:
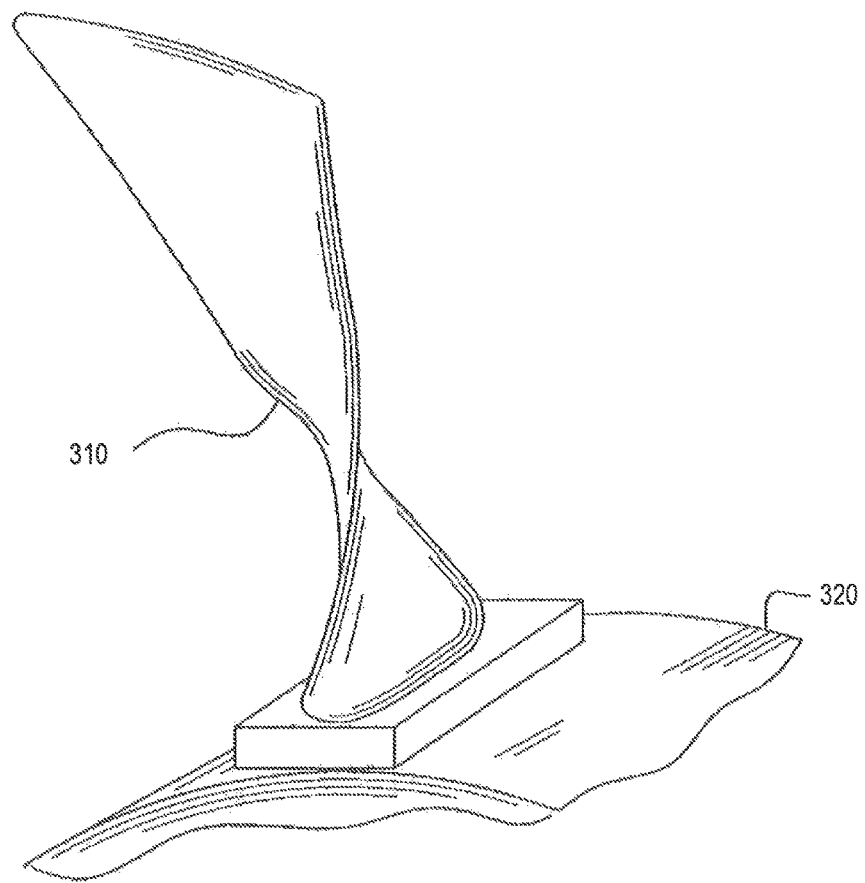
FIG. 3 illustrates a perspective view of an airfoil according to various embodiments.

Referring to FIG. 3, a blade 310 is illustrated according to various embodiments. Blade 310 may comprise an airfoil fan blade which curves in three dimensions. The blade 310 may be coupled to a rotor 320 via an attachment feature.

Figure 4:
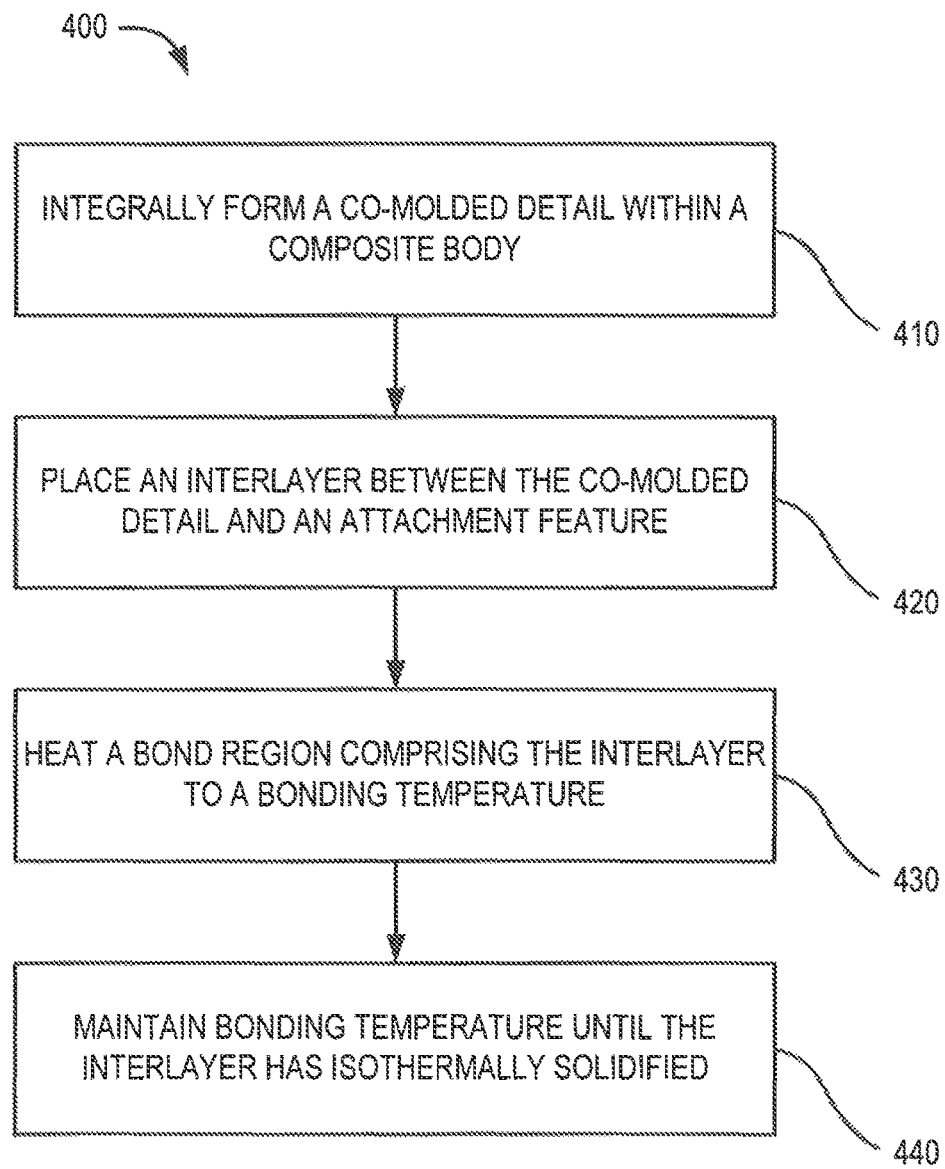
FIG. 4 illustrates a method of manufacturing a fan blade according to various embodiments.

Referring to FIG. 4, a method 400 for manufacturing a composite blade bonded to a metallic root is illustrated according to various embodiments. A co-molded detail and a co-molded edge may be integrally formed with a composite body (step 410). The co-molded detail and the co-molded edge may be placed in a mold. A plurality of plies may be formed in the mold in contact with the co-molded detail and the co-molded edge. Although both a co-molded detail and a co-molded edge are described in the present embodiment, in various embodiments blades may be manufactured with only one of a co-molded detail or co-molded edge.

A metallic attachment feature may be TLP bonded to the co-molded detail. The TLP bonding may comprise placing an interlayer between the metallic attachment feature and the co-molded detail (step 420). The interlayer material may comprise a variety of material types, including a thin foil, amorphous foil, fine powders with or without a binding agent, powder compact made by sintering, brazing paste, a physical vapor deposition process such as sputtering, a spray coating, electroplating, or evaporating an element out of the substrate material to create a "glazed" surface. The interlayer may be comprised of a variety of metals or alloys, including but not limited to nickel, aluminum, copper, iron, zinc, titanium, silver, magnesium, lead, etc.

A bond region comprising the interlayer and surrounding areas may be heated to a bonding temperature, and the interlayer may melt and diffuse into the attachment feature and the co-molded detail (step 430). In various embodiments, the heating is performed in a vacuum, however, in various embodiments the heating occurs in an inert atmosphere, such as argon. The heating may be performed by various methods, for example, radiation, conduction, radio-frequency induction, resistance, laser, and/or infrared. Heating of the bond region continues until the bonding temperature has been reached. In various embodiments, the bonding temperature may be significantly above the interlayer's melting point to ensure complete melting of the interlayer and to increase the rate of diffusion.

The assembly may be held at the bonding temperature until the liquid has isothermally solidified due to diffusion (step 440). The bond may be homogenized at a suitable heat-treating temperature which can occur directly after bonding or at a subsequent point. The bond's remelting temperature may be significantly above the interlayer melting temperature. In various embodiments, the bond's remelting temperature may be hundreds of degrees Celsius or more above the interlayer melting temperature. Thus, the fan blade may operate at temperatures higher than the melting temperature of the interlayer without separating from the attachment feature.

In various embodiments, partial transient liquid phase (PTLP) bonding may be utilized. PTLB is a variant of TLP bonding which may be used to join non-metallic materials. In various embodiments, at least one of the co-molded detail and the attachment feature may comprise a non-metallic material. In PTLP bonding, the interlayer may comprise at least one thin layer of low-melting-point metal or alloy on each side of a thicker refractory metallic or alloy layer. Upon heating, a liquid may be formed by each thin layer which wets the non-metallic material while concomitantly diffusing into the refractory core. The liquid regions may solidify isothermally and homogenization of the bond region may lead to a refractory bond. For more information regarding TLP and PTLB bonding, see Cook III et al., *Overview of Transient Liquid Phase and Partial Transient Liquid Phase Bonding*, J. Mater Sci., 2011, 46:5305-5323, the contents of which are incorporated by reference herein in their entirety.

Figure 5:
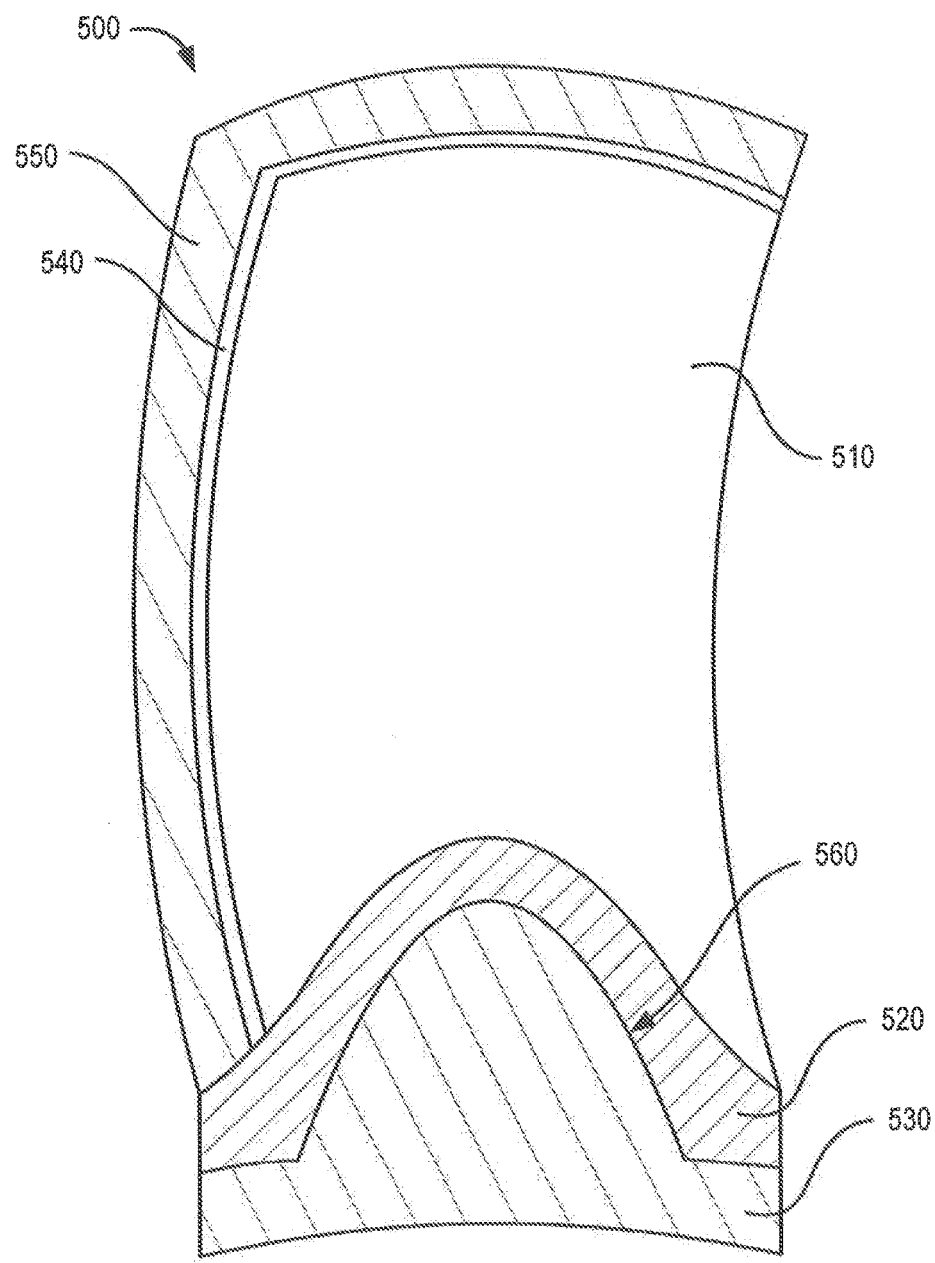
FIG. 5 illustrates a cross-section view of a fan blade according to various embodiments.

Referring to FIG. 5, a cross-section of a blade 500 is illustrated according to various embodiments. In various embodiments, blade 500 may comprise an airfoil fan blade. Blade 500 may comprise a body 510, a co-molded detail 520, an attachment feature 530, a co-molded edge 540, and a metallic edge 550.

Body 510 may comprise a composite laminated structure. Body 510 may comprise a plurality of plies of reinforced fabric such as graphite, fiberglass, Kevlar, etc. The various plies may be bonded together via a matrix material, such as an epoxy resin. The matrix material may keep the plies from delaminating when a stress is applied to blade 500.

Co-molded detail 520 may be integrally formed with body 510. The co-molded detail may be part of the laminate, as fabricated. As such, the co-molded detail may become, in effect, part of the composite structure. The co-molded detail may transfer load to the remaining composite through the matrix material. In addition, the composite may be woven onto, or through receiving features in the co-molded detail so that the fibers directly provide mechanical restraint. Adhesive may also be used between the co-molded detail and the remaining composite structure. One example of an adhesive that may be used is a "film adhesive". The detail may also be stitched into place using examples of reinforcing fibers as previously listed (e.g. graphite, fiberglass, KEVLAR (aramid fiber)). Co-molded detail 520 may comprise a material suitable for TLP or PTLP bonding, such as a metal, CMC, or MMC. Co-molded detail 520 may comprise any shape. As illustrated in FIG. 5, co-molded detail 520 may comprise a concave conical shape. However, co-molded detail 520 may be manufactured for any design requirements. The conical shape illustrated in FIG. 5 provides a larger contact area between co-molded detail 520 and body 510 as compared to a flat co-molded detail. The increased contact area provides increased attachment strength, decreasing the potential for separation when a shear force is applied. The conical shape may also prevent the bond line from being entirely under a shear loading. Co-molded detail 520 may further be coupled to composite body 510 via at least one of interleaves, stitching, weaving, and interlock. Similar to co-molded detail 520, co-molded edge 540 may be integrally formed with body 510 and may comprise a metallic material.

Attachment feature 530 may comprise any structure capable of coupling blade 500 to another object, such as a rotor or stator. Attachment feature 530, also known as a root, may comprise any material suitable for TLP or PTLP bonding, such as a metal. Attachment feature 530 may act as an interface between blade 500 and a rotor, which allows a composite body 510 to be coupled to a metallic object. Thus, the optimal material for body 510 may be selected independent of the optimal selection of the rotor material. As blade 500 revolves about an axis of rotation, a stress may be applied to blade 500, which may cause body 510 to separate from attachment feature 530 if the bonds between the various components are not sufficiently strong.

Metallic edge 550 may comprise a material suitable for TLP or PTLP bonding, such as aluminum, and may be TLP or PTLP bonded to co-molded edge 540. Metallic edge 550 may provide protection for body 510. As blade 500 rotates, impacts from debris and other particulate matter may damage composite materials. However, metallic edge 550 may comprise a metallic material which is less susceptible to impact damage than body 510. Thus, metallic edge 550 may prolong the life of blade 500.

Fan blade 500 may further comprise TLP bond region 560. TLP bond region 560 may be located between co-molded detail 520 and attachment feature 530. In TLP bond region 560, a portion of the interlayer material may be present. However, in various embodiments, the interlayer material may completely dissolve into co-molded detail 520 and/or attachment feature 530. In various embodiments, a grain size of the metal may be different in TLP bond region 560 than in co-molded detail 520 or attachment feature 530. Furthermore, in various embodiments, TLP bond region 560 will not melt when heated to the bonding temperature, as compared to a brazed joint which may undergo at least some incipient or localized melting upon heating to the bonding temperature. This increased remelting temperature of TLP bond region 560 may result in greater bond strength at the bonding temperature as compared to a brazed or welded joint.

Figure 6:
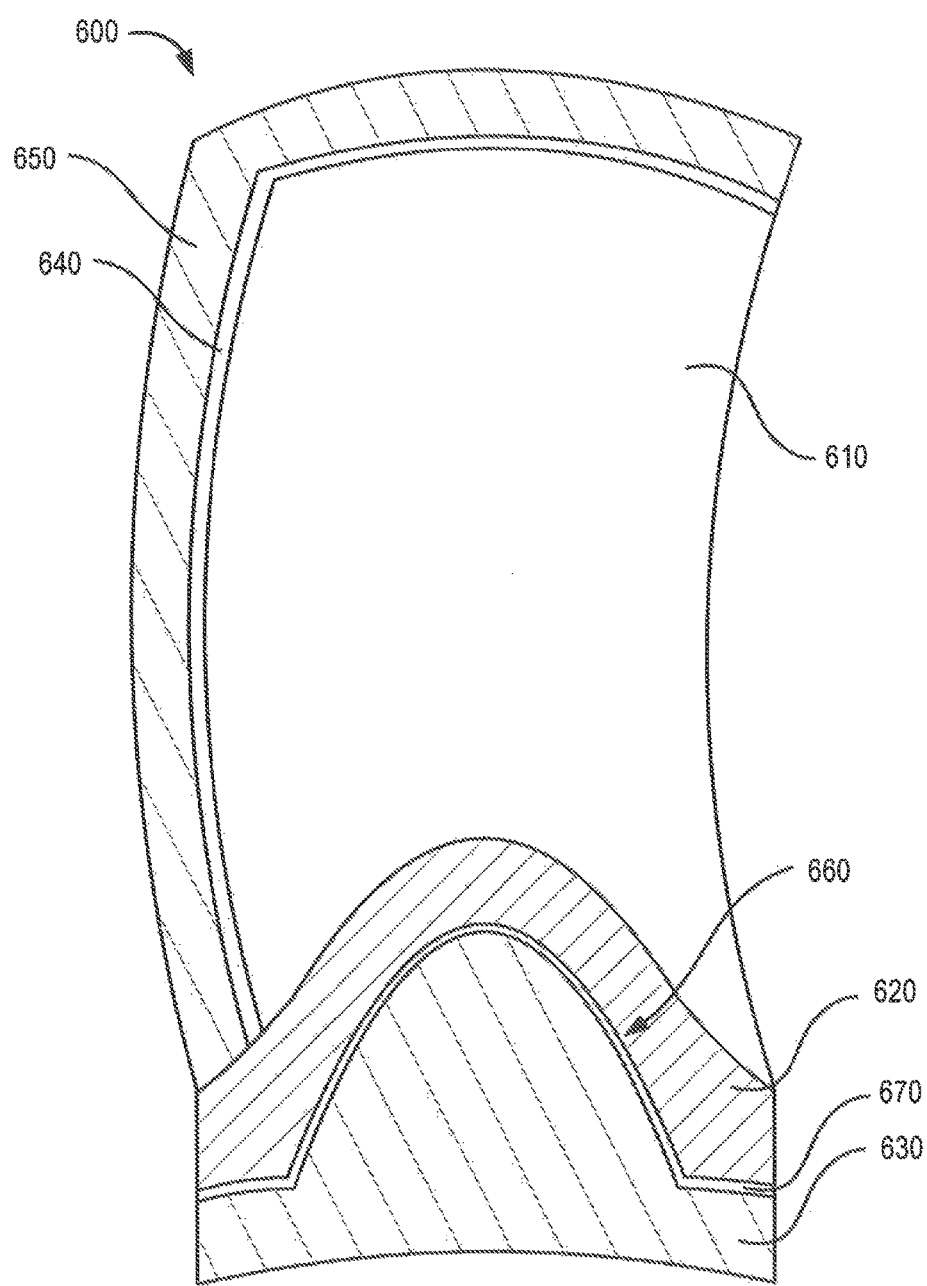
FIG. 6 illustrates a cross-section view of a fan blade with an interlayer according to various embodiments.

Referring to FIG. 6, a cross-section of a blade 600 is illustrated according to various embodiments. In various embodiments, blade 600 may comprise an airfoil fan blade. Similar to airfoil fan blade 500, blade 600 may comprise a composite body 610, a co-molded detail 620, an attachment feature 630, a co-molded edge 640, and a co-molded metallic edge 650. Fan blade 600 may further comprise TLP bond region 660. However, in FIG. 6, interlayer 670 may not have completely dissolved into co-molded detail 620 and attachment feature 630. Thus, a portion of interlayer 670 may still be present after bonding has occurred.

Although discussed primarily with reference to turbine engines, the present disclosure may be implemented in any system where a non-metallic component is attached to a metallic component.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. Different cross-hatching may be used throughout the figures to denote different parts but not necessarily to denote the same or different materials. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fan blade comprising:
    a metallic root;
    a metallic leading edge;
    a composite body bounded at least partially by the root and the metallic leading edge, the composite body comprising a laminated structure;
    a first co-molded member disposed between and coupled with the metallic leading edge and the composite body, the first co-molded member comprising at least one of a metal, a ceramic matrix composite, or a metal matrix composite, wherein the first co-molded member is coupled to the composite body by at least one of interleaves, stitching, weaving, adhesive, and interlock.

2. The fan blade of claim 1, further comprising a second co-molded member, the second co-molded member disposed between and coupled with the root and the composite body, the second co-molded member comprising at least one of a metal, a ceramic matrix composite, or a metal matrix composite, wherein the second co-molded member is coupled to the composite body by at least one of interleaves, stitching, weaving, adhesive, and interlock.

3. The fan blade of claim 1, wherein the composite body comprises a plurality of plies of reinforced fabric.

4. The fan blade of claim 2, wherein the second co-molded member is integrally formed within the composite body.

5. The fan blade of claim 1, wherein the first co-molded member is integrally formed within the composite body.

6. The fan blade of claim 2, further comprising a transient liquid phase bond interlayer between the second co-molded member and the root.

7. The fan blade of claim 2, wherein the root is coupled to the second co-molded member via at least one of transient liquid phase bonding and partial transient liquid phase bonding.

8. The fan blade of claim 1, wherein the metallic leading edge is coupled to the first co-molded member via transient liquid phase bonding.

9. A rotor comprising:
a disk; and
an airfoil coupled to the disk, the airfoil comprising:
    a metallic root;
    a metallic leading edge;
    a composite body bounded at least partially by the root and the metallic leading edge;
    a metallic first co-molded member disposed between and coupled with the metallic leading edge and the composite body, wherein the first co-molded member is coupled to the composite body by at least one of interleaves, stitching, weaving, adhesive, and interlock; and
    a second co-molded member, the second co-molded member disposed between and coupled with the root and the composite body, the second co-molded member comprising at least one of a metal, a ceramic matrix composite, or a metal matrix composite, wherein the second co-molded member is coupled to the composite body by at least one of interleaves stitching, weaving, adhesive and interlock;
    wherein the metallic root is transient liquid phase bonded to the second co-molded member.

10. The rotor of claim 9, wherein the airfoil further comprises a transient liquid phase bond interlayer located between the second co-molded member and the root.

11. The rotor of claim 9, wherein the first co-molded member is integrally formed within the composite body, and wherein the metallic edge is transient liquid phase bonded to the first co-molded member.

* * * * *